Patented Apr. 16, 1940

2,197,241

UNITED STATES PATENT OFFICE 2,197,241

METHOD OF TREATING VANADIUM ORES

George A. Hatherell, Roscoe, Calif., assignor to Frank A. Garbutt, Los Angeles, Calif.

No Drawing. Application June 20, 1938, Serial No. 214,843

5 Claims. (Cl. 23—19)

My invention relates to methods of extracting selected constituents from ores, with particular reference to vanadium ores, and is specifically directed to a method of extracting vanadium values from ores or processed ores containing vanadates.

The vanadium ores to which my method may be profitably applied are found in sandstone deposits in the western part of the United States and contain large percentages of silica, together with varying amounts of such substances as iron oxide, alumina, calcium carbonate, magnesium carbonate, and traces of insoluble barium and strontium salts.

In the usual practice, the vanadium ore is roasted with a salt, such as sodium chloride, as a preliminary step. During the salt roast, a large number of reactions take place, including the important oxidation of all the vanadium oxides to vanadium pentoxide $V_2O_5$ and the production of vanadate from this oxide. Formulas such as $XV_2O_6$, $XV_2O_7$, $XV_2O_8$, etc., indicate the chemical form of soluble and insoluble vanadates in the roasted ore, the "X" in the formulas representing any metal contained in the ores or added during the roast that is capable of forming a vanadate. The metals commonly encountered, depending upon the character of the ore, may include, for example, calcium, sodium, barium, strontium, and magnesium. In general, vanadates may be considered as salts of a vanadic acid having the formula $H_{n+2}V_nO_{3n+1}$.

After roasting, the ore is leached to draw off vanadium compounds which are later processed to yield the pentoxide. If all of the various vanadates were as soluble as sodium vanadates, a simple leaching treatment would be effective to draw off a profitable proportion of the vanadium in the ore. Unfortunately, however, calcium, magnesium, barium and strontium, most of which are invariably present in substantial quantities, form insoluble vanadates during the salt roast which may not be drawn off with a simple aqueous leach. A further deterrent to the recovery of vanadium by simple leaching is that those metals that do not combine with the vanadate ion in the roast are rendered soluble through the destruction of carbonates during heating and such metals subsequently in the leach solution form precipitates of insoluble vanadates. The undesirable soluble metals may be reduced in quantity to a certain extent in the roasting process by combining to form insoluble silicates, but any substantial percentages in the ore will result in sufficient quantities surviving to destroy the effectiveness of the leaching treatment. For example, as soon as the amount of calcium carbonate rises above 1% of the ore, some of it will invariably find its way into the leach to precipitate therefrom insoluble calcium vanadate.

It has been discovered heretofore that such metals carried over to the leach may be prevented from then combining with vanadium oxides if the leaching solution is acid. The effect of the acid leach is to transform the vanadate ion into vanadic form, the vanadium being moved from the negative ion to the positive ion, which, of course, cannot combine with the positive metal ions.

From experience with vanadium oxides it has been the understanding in the art heretofore that the solubility of all vanadium compounds in acid increases with the ratio by weight of the acid in solution to the ore under treatment, and that a relatively high acid-ore ratio and an acid of at least 0.4 N, or in the case of sulphuric acid a solution of at least 2% strength, is required to insure transforming the vanadate ions into vanadic form and to draw off substantial quantities of vanadium compounds. A 2% concentration of sulphuric acid in a volume equal in weight to the ore being treated will carry off a maximum quantity of vanadium compounds amounting to only 0.3% of the weight of the ore. To recover a substantial proportion of the potential yield of ordinary ore requires an excessive volume of solution of such strength at prohibitive cost, as much as nine pounds of acid being consumed in the production of one pound of the final pentoxide.

Using a leaching solution of equal weight to the ore, commercial recoveries are possible with an acid concentration of 9.0% to 10%, and more than 95% of the potential yield of representative ore may be recovered with a 15% concentration of acid, but it is to be noted that such recoveries require relatively high acid-to-ore weight ratios of .09 to .15.

A further disadvantage of employing acids of the heretofore indicated strength is that the solubility in the leach of undesirable ore constituents, such as silicates and aluminates, also rises rapidly with the strength of the acid. In fact, with increasing acid concentration the quantity of undesirable constituents dissolved rises at a much greater rate than the quantity of vanadium compounds dissolved, especially if the ore contains only a relatively small percentage of vanadium.

The problem of drawing off undesirable constituents with an acid solution may be emphasized by referring to a suggestion in the prior art of first leaching with water and then leaching with a solution of, say, 2% sulphuric acid. When such a process was applied to one ore, the water leach dissolved vanadium compounds equivalent to eighteen pounds of the pentoxide per ton of ore together with approximately ten pounds of the undesirable constituents, and while the subsequent acid leach added vanadium compounds equivalent to only six pounds of the pentoxide, it also carried over approximately thirty additional pounds of the undesirable constituents. It is to be noted, of course, that a straight water leach is wasteful since it does not prevent certain undesirable metal ions from precipitating vanadium compounds, as heretofore noted.

My invention is characterized by the conception of employing weaker solutions of acids than heretofore indicated in the art and is based on the discovery that as the strength of an inorganic acid leach is reduced from 2% to a neutral solution, there is a narrow range in which the solvent action of the acid on vanadium compounds in ore with specific reference to vanadates rises to a peak of relatively high value, and the further discovery that this anomalous behavior of the acid is selective for my purpose inasmuch as it does not apply to the undesirable concomitant constituents of the ore. I do not know why relatively weak acid solutions have such marked solvent action on vanadium, but I suspect that the phenomenon involves the transforming of one form of vanadium to another. For example, in the case of calcium the shift may be from $Ca_2V_2O_7$ to $CaV_2O_6$, or from $CaV_2O_6$ to $Ca(VO_3)_2$.

This range of increased solvent action on vanadates lies in the case of sulphuric acid between a strength of 0.1% and 1.0% acid. I ordinarily prefer to employ approximately 0.5% strength. In actual practice I have found that maximum increase in solvent action on vanadates is attained if the solution is maintained at a light yellow color, and that the further addition of acid to the point of shifting to orange color may precipitate vanadium compounds during the leaching operation. The effective acid concentration during leaching is much below the percentage of acid actually used since the ore tends to absorb most of the acid and to act as a buffer. Apparently the ore tends to hold the actual acidity of the solution very nearly at a constant level by absorbing excess acid.

The surprising effect of employing relatively weak sulphuric acid in leaching vanadates from roasted ore may be understood by comparing the effectiveness of various solutions of volume equal in weight to the ore to be treated, the ore selected having a potential yield of 2% vanadium pentoxide. Initial leaching with 2% sulphuric acid will recover only the equivalent of six pounds of vanadium pentoxide per ton as heretofore noted, amounting to only 15% of the potential forty pounds of pentoxide. Initial leaching with plain water, though undesirable, will, when followed by leaching with 2% sulphuric acid, recover as much as the equivalent of approximately 64% of the potential quantity of pentoxide. But a single leaching operation with 0.5% sulphuric acid will carry off vanadium compounds equivalent to thirty to thirty-two pounds of $V_2O_5$, or 75% to 80% of the potential yield of the ore. It is apparent, then, that while a 2% sulphuric acid solution equal in weight to the ore will recover only a third as much of the vanadium as will plain water, the recovery with an acid solution of 0.5% strength is 67% to 78% greater than with plain water.

The selectiveness of my relatively weak acid solution in its solvent effect may be understood by noting that the total quantity of material from the ore going into solution is comparable to the total quantity of material that would go into a plain water leach. For example, in experimenting with one ore, I found that water of weight equal to the ore dissolved out approximately 5% of the ore, whereas a 0.5% acid solution of weight equal to the ore increased the total solute to only 6%, and a 1.0% acid concentration of weight equal to the ore brought the proportion of solute up to only 6½%. But substituting 0.5% acid for water raised the quantity of dissolved vanadium compounds per ton of ore from the equivalent of eighteen pounds to the equivalent of thirty pounds or more of the pentoxide, as noted heretofore.

A further feature of my invention is the discovery that saturating the acid solution with chlorine will additionally boost the recovery of vanadium pentoxide 5% above that obtainable by the dilute acid alone.

While my invention is not limited to an ore treating process in which the first stage consists of roasting the ore with a salt, it is peculiarly applicable to such a process, since the vanadium in such ore that reaches the leaching tank is in the form of vanadates. When an ore contains approximately 2% of vanadium pentoxide, the quantity of sodium chloride need not exceed 6%. If the ore is rich in vanadium, more salt may be used. For example, in roasting ore containing 5% of vanadium pentoxide, 12% salt is advisable.

It is apparent from the foregoing that my invention is the treating of vanadium ore with acid of less strength than a 2% sulphuric solution, in other words, an inorganic acid solution of less than ⅓ N. More specifically, my invention is the employment of an acid strength for this purpose within the aforementioned anomalous range, lying approximately between 0.1% and 1.0% of sulphuric acid, or between 1/50 N and ⅕ N. In the preferred practice of my invention, the ore is treated with chlorine as well as acid.

While sulphuric acid is preferred, it is to be understood that other acids of equivalent strengths may be employed. The strong inorganic acids, hydrochloric and nitric, are especially suitable for substitution in the process.

The acid solution of vanadates drawn from the ore in accordance with the teachings of my invention may be subsequently processed in any of the suitable ways known to the art to obtain vanadium in commercial form, the usual form sought being vanadium pentoxide.

I claim as my invention:

1. A method of processing vanadium ore containing vanadates to extract vanadium compounds therefrom, said method being characterized by the step of leaching the ore with an acid solution having an initial concentration between 1/50 N and ⅕ N.

2. A method of processing vanadium ore containing vanadates to extract vanadium compounds therefrom, said method being characterized by the step of leaching the ore with chlorine in an acid solution having an initial concentration between 1/50 N and ⅕ N.

3. A method of processing vanadium ore to extract vanadium compounds therefrom, said method being characterized by the steps of treating the ore to change at least a portion of the vanadium content into vanadate form, and leaching the ore so treated with an acid solution having an initial concentration between $\frac{1}{50}$ N and $\frac{1}{5}$ N.

4. A method of processing vanadium ore to extract vanadium compounds therefrom, said method being characterized by the steps of roasting the ore with a salt to change at least a portion of the vanadium content of the ore into vanadate form, and leaching the treated ore with an acid solution having an initial concentration between $\frac{1}{50}$ N and $\frac{1}{5}$ N.

5. A method of processing vanadium ore to extract vanadium compounds therefrom, said method being characterized by the steps of roasting the ore with a salt to change at least a portion of the vanadium content of the ore into vanadate form, and leaching the treated ore with chlorine in an acid solution having an initial concentration between $\frac{1}{50}$ N and $\frac{1}{5}$ N.

GEORGE A. HATHERELL.